April 29, 1958
H. BLACKSTONE
2,832,820
SCANNING MECHANISM
Filed March 19, 1953
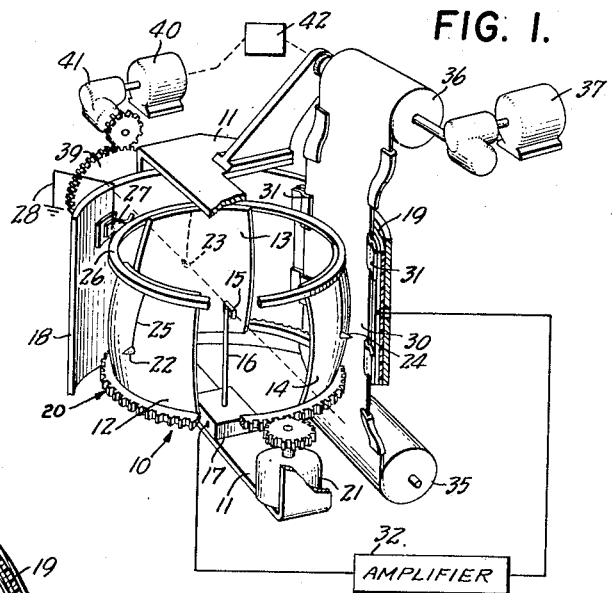
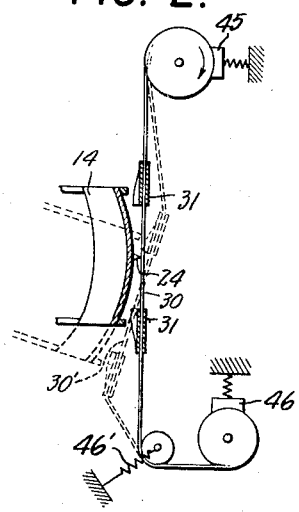
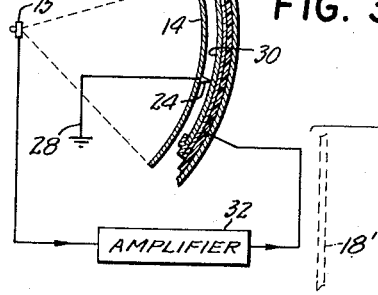
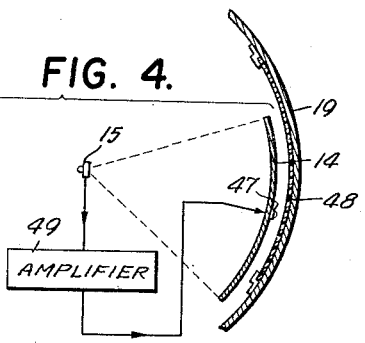
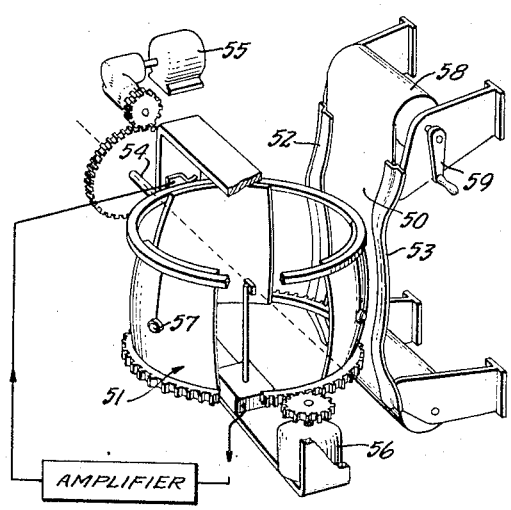
INVENTOR.
HENRY BLACKSTONE
BY
Mitchell & Bechert
ATTORNEYS United States Patent Office 2,832,820
Patented Apr. 29, 1958

2,832,820

SCANNING MECHANISM

Henry Blackstone, Northport, N. Y., assignor to Servo Corporation of America, New Hyde Park, N. Y., a corporation of New York Application March 19, 1953, Serial No. 343,369

20 Claims. (Cl. 178—6.6)

My invention relates to an improved optical-scanning and recording means, and to energy-responsive means utilizing such optical scanning. As an infrared scanner, the invention may provide an improved means of aerial reconnaissance, or it may be scanning infrared camera, fixedly mounted, as on a tripod. The present application incorporates certain refinements and improvements over the invention disclosed in the copending patent application of Henry Blackstone and Frank C. Willey, Serial No. 320,272, filed November 13, 1952, and over the copending patent application of Henry Blackstone, Serial No. 339,701, filed March. 2, 1953.

It is an object of the invention to provide improved scanning means of the character indicated.

It is another object to provide improved means for continuously and automatically scanning a field of view for varying energy levels in said field.

It is a further object to provide improved recording means for scanning means of the character indicated.

It is a specific object to meet the above objects with a mechanism which may more or less directly produce its own scanning record, and which will be self-synchronizing, as between scanning and recording parts.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified view in perspective, partly broken away and illustrating elements of a scanning and recording device incorporating features of invention;

Fig. 2 is a simplified fragmentary sectional view illustrating a slight modification of the arrangement shown in Fig. 1;

Figs. 3 and 4 are enlarged fragmentary sectional views illustrating alternative recording methods for systems as shown in Figs. 1 and 2; and Fig. 5 is a view similar to Fig. 1 and illustrating a further embodiment of the invention.

Briefly stated, my invention contemplates direct-recording scanning devices which may employ scanning elements of the general character set forth in the two above-identified copending patent applications. The basic scanning means may comprise energy-responsive means fixedly carried by a support and collecting optics focused on the energy-responsive means may be journaled for rotation on the support. A recording element, such as a stylus electrode or a modulated-light source, may be carried by the rotating optical assembly and may be connected, as through suitable amplifying means, to the output of the energy-responsive means. Means may be provided for supporting a photographic plate, film, or other recording paper or the like in an arc about the scanning axis, said arc occurring at least substantially at the radial plane described by movement of the recording element. A direct record is developed as the plate, film, paper or other recording surface is moved relatively to and generally transversely of said radial plane.

In one general form to be described, as for aerial reconnaissance purposes, the desired transverse relative movement of the recording element and of the sensitized surface is achieved by driving the film or paper while holding the scan axis fixed, so that the developed image reflects movement within or movement of the scan field. In another form, as when fixedly mounted on the ground, means are provided for inclining the support means about a scan-depression axis so that the developed image reflects the energy levels in the field scanned by such depression. In still another form, the recording paper or the like is fixed to the frame and is supported arched over a generally spherical surface, arcuate about the scan-depression axis and arcuate at about the scan axis.

Throughout the specification, reference will be made to the scan-depression movement as being downward with respect to the frame, but it will be understood that these words do not necessarily limit the desired or preferred movement of the support. For example, in certain cases, it may be desirable that the scan-depression movement for each exposure shall be an upward progression about a horizontal axis; alternatively a right-to-left or left-to-right movement may be involved about a vertical axis. In any case, the motion will be understood to be about an axis generally transverse to the scanning axis and to be adequately described by the term "scan-depression."

Referring to Fig. 1 of the drawings, my invention is shown in application to an optical-scanning assembly 10, journaled in means (not shown) for rotation about a scanning axis fixed with respect to support means 11; the scanning mechanism is preferably driven in continuous rotation, and for this purpose I provide a ring gear 20 and drive motor 21 therefor. The optics may include one or more lenses spaced about the scanning axis, but in the form shown I have employed an odd number of concave mirrors 12—13—14 of width equal to the angular spacings between mirrors. The optical elements 12—13—14 may be alike and focused on centrally located energy-responsive means 15; the means 15 is shown mounted on the scan axis, as upon a standard 16 fixed to a base 17, which in turn may include preamplifier means and may be fixed to the support means 11.

In the described structure, energy available over a given sector about the scan axis will be collected by successive of the mirrors 12—13—14 and successively focused on the energy-responsive means 15. In order to assure that energy collection will be secured over only the desired sector, I schematically indicate window means 18 comprising an opening in a shield 19 encompassing the scanning mechanism and carried by the support means 11.

In accordance with a feature of the invention, I provide a plurality of recording elements 22—23—24 on the scanning drum, so that the recording may be self-synchronizing and directly developed. The recording elements 22—23—24 serve to commutate intelligence developed by the corresponding collecting mirrors 12—13—14, and I have, therefore, shown these recording elements fixedly carried by the respective mirrors; for accurate synchronization, the recording elements 22—23—24 should be spaced in accordance with the effective angular spacing of the mirrors, as will be understood. The recording elements 22—23—24 are shown as electrode styli connected (as by means 25—26) electrically in parallel. The means 26 may be a slip ring having continuous contact with a brush 27, fixed to the shield 19 and, therefore, to the support means 11, and grounded as suggested at 28. The recording element 22—23—24 may produce recording discharges on sensitized recording paper or the like 30, positioned by suitable support or guide means 31 in an arc about the axis of scan, said arc occurring at least in the radial plane of movement of the recording elements 22—23—24. I have shown that the signal from preamplifier 17 may be further amplified at 32 and fed directly to the outer side of the recording paper or the like 30; a curved backing platen 34 (Fig. 3) behind the paper 30 will serve adequately as the signal electrode, placing the sensitive portion of the paper directly in the discharge gap established to ground by way of succeeding styli 22—23—24.

In operation, it will be seen that, as the optics is continuously driven, each of the mirrors will be successively exposed to the window openings, and the response due to each mirror (as in the case of the mirror 14 shown in Fig. 3) will be developed as an electrical discharge signal directly across the recording paper or the like 30, applied between the stylus 24 and the backing plate 34.

In order to develop a two-dimensional record representing the response to energy collected by successive optical elements, I provide for the generally transverse relative movement of the paper and of the radial plane of the recording elements 22—23—24. In Fig. 1, I suggest that a supply reel 35 and a take-up reel 36 may be carried by the support means 11 and may be driven by motor means 37, the movement being continuous for each exposure. If the field of view is moving or if there is motion to be observed across a scan line in a field of view (analogous to the use of a strip camera in aerial reconnaissance), then the motor means 37 may be continuously driven at a rate (V/H rate of the aircraft) to produce the desired spacing between recording lines on the paper 30. If, on the other hand, the frame of the device is to be held stationary, as in the case of the camera mechanism disclosed in the above-identified patent application of H. Blackstone, then it becomes desirable to provide a scan-depression movement and drive for the support means 11. The scan-depression mechanism will be understood to be sufficiently suggested by the gear 39 on a scan-depression shaft (not shown), journaled in the frame and inclinably supporting the support means 11; the scan-depression axis, namely, the axis (shown in Fig. 1 by a thin elongated dashed line) about which gear 39 is driven to bodily displace the support means 11, is preferably symmetrically disposed with respect to the center of symmetry of the window means 18. A motor 40 may, through suitable reduction gearing 41, then achieve the desired scan-depression movement. If desired, automatic switches, including reversing connections, may be provided as disclosed in greater detail in the said H. Blackstone application; as also indicated in said application, coordination between the paper drive and the scan-depression drive may be desired, and at 42 I suggest a synchronizing connection (such as suitable reduction gearing) to provide this function.

In Fig. 2, I illustrate a slight modification of the arrangement discussed in connection with Fig. 1. The scanning drum including mirror 14 will be recognized, as will also the recording element 24 carried thereby and the guide elements 31 for the recording paper or the like 30. In Fig. 2, however, instead of providing mechanism to advance the paper 30, I provide clamping mechanism such as brake shoes 45—46 carried by the frame of the device and serving to anchor both ends of the free stretch of recording paper 30, between the supply and take-up reels 35—36; if desired, spring-tensioning means 46 may relieve any tendency for the stretched paper to slacken. With the described construction, it will be understood that the recording paper will be variously inclined (as suggested by the dotted outline 30') during the progress of a scan-depression movement, but that, for each sweep of a recording element 24 (or 33 or 23) past the paper, a slightly displaced sector of the paper will be exposed, so that a two-dimensional record will be developed by properly spaced successive line-scan traces; this will be true even though the paper is not advanced on the reels 45—46 during the course of the exposure (cycle of scan-depression).

In Fig. 4, I illustrate an alternative recording element which may be employed in place of the stylus or element which may be employed in place of the stylus or electrode-type recording element discussed above. The recording element 47 of Fig. 4 may be a light source and may include a lens for focusing a spot of the desired size upon the recording paper or the like 48, which may be photographic film or paper. The light source of recording element 47 may be energized by amplifier means 49, which will be understood to include the preamplifier means 17 and such other amplification as is necessary to produce the required intensity modulation on the light source. In order that the paper or film 48 shall not become light struck through light admitted by window 18, I illustrate at 18' filter means passing substantially only energy to which paper 48 is not responsive; for example, the filter window 18' may be infrared-transmitting, and means 15 may be particularly responsive to infrared radiation, while paper 48 may be so-called process film or paper, having substantially no response in the infrared region.

In Fig. 5, I illustrate another embodiment of the invention which is characterized by a slightly different mode of supporting the recording paper or the like 50. This paper is shown to be arched in the region immediately adjacent the optical-scanning head 51, by means of specially formed guides 52—53 permitting the slidable movement of the paper when desired, as when indexing the paper 50 for a succeeding exposure. The arching achieved by the guides 52—53 is preferably such as to position the film 50 generally in a spherical segment, that is arcuately about the scan axis and about the scan-depression axis 54. In operation, the scan-depression drive 55 will commence for each exposure at one limit of scan-depression, and will proceed about axis 54 at a relatively slow rate compared with that produced by scan drive 56; as these two movements proceed, recording element 57 will project successive lines of intensity-modulated light spots (or other energy discharges) across the arched recording paper. Upon completion of the exposure, the energy responsive means may be effectively disconnected from the recording elements 57 (as by video on-off control means discussed in greater detail in the said Blackstone application), and the take-up reel 58 for the film 50 may be advanced or indexed by a simple manual operation at 59, thereby readying the device for the next exposure.

It will be appreciated that I have disclosed novel direct-recording optical-scanning mechanisms which involve substantial simplification over scanning and recording systems of the above-identified patent applications. Not only is a simpler mechanism achievable, but the presently disclosed arrangements are self-synchronizing and self-commutating, in that all recording elements may be energized parallel, but only the correct recording element will be caused to produce a record on the sensitized film or paper surface.

While I have described my invention for the preferred forms shown, it will be understood that modifications may be made within the scope of the invention as defined in the claims which follow.

I claim:

1. Optical-scanning and recording means, comprising support means, energy-responsive means relatively fixedly carried by said support means, optics including a focusing element focused upon said energy-responsive means and mounted for bodily rotary displacement about said energy-responsive means and about an axis fixed with respect to said support means, a sensitive recording surface external to the path of movement of said optics about said axis and including a portion arcuate about said axis, a recording element mounted for rotation about said axis and carried with said optics and traversing an arc across said recording surface for each rotary sweep of said focusing element, said surface being responsive to the energy discharge of said recording element, and means connecting said recording element for response to the output of said energy-responsive means.

2. Optical-scanning and recording means according to claim 1, in which said recording element is a stylus, and in which said sensitive surface is sensitive to electrical discharges across the gap defined by said surface and said stylus.

3. Optical-scanning and recording means according to claim 1, in which said recording element is a light source, and in which said surface is photo-responsive to emanations from said source.

4. Optical-scanning and recording means according to claim 3, in which said recording element also includes focusing means focusing light from said source into a spot on said arc.

5. Optical-scanning and recording means, comprising support means, energy-responsive means relatively fixedly carried by said support means, optics including a focusing element focused upon said energy-responsive means and mounted for bodily rotary displacement about said energy-responsive means and about an axis fixed with respect to said support means, a recording element carried with said optics for rotation about said axis and producing an energy discharge external to the path of movement of said optics, means connecting said recording element for response to the output of said energy-responsive means, a flexible recording paper or the like responsive to discharges from said recording element, support means for supporting said paper or the like in an arc about said axis at least in the radial plane of movement of said recording element, and means for moving said paper and support means relatively to each other in a sense generally transverse to said radial plane.

6. Optical-scanning and recording means according to claim 5, in which said last-defined means includes drive means for advancing said paper or the like.

7. Optical-scanning and recording means according to claim 5, and including drive means for inclining said support means about a scan-depression axis and generally perpendicular to said axis of rotation and generally parallel to the chord subtended by said arc.

8. Optical-scanning and recording means according to claim 7, in which said first and second-mentioned support means are fixed with respect to each other.

9. Optical-scanning and recording means according to claim 7, in which said second-mentioned support means is frame-based and includes guide means for arching said paper or the like over a segment that is generally spherical and arcuate about the scanning axis and about the scan-depression axis.

10. Optical-scanning and recording means, comprising support means, energy-responsive means relatively fixedly carried by said support means, optics including a plurality of angularly spaced focusing elements focused upon said energy-responsive means and mounted for rotation about said energy-responsive means and about an axis fixed with respect to said support means, window and screen means carried by support means and screening and limiting the response of said optics to an arc no greater than 180° about said axis, a recording element for each of said focusing elements and mounted in angularly spaced relation corresponding to the angular separation of said focusing elements and carried with said focusing elements for rotation about said axis, support means for recording paper or the like and including means for arching such paper generally arcuately about said axis of rotation in substantially the radial plane defined by the path of movement of said recording elements, and drive means for advancing the paper or the like relatively to said radial plane.

11. Optical-scanning and recording means according to claim 10, and including scan-depression drive means for inclining said support means about an axis substantially perpendicular to the scan axis and through said radial plane.

12. Optical-scanning and recording means according to claim 11, in which said scan-depression axis is symmetrically disposed with respect to the center of symmetry of said window means.

13. Optical-scanning and recording means according to claim 11, and including a synchronizing connection between said scan-depression drive means and said first-mentioned drive means.

14. Optical-scanning and recording means, comprising a frame, support means inclinable about a scan-depression axis on said frame, energy-responsive means relatively fixed carried by said support means, optics including a focusing element focused upon said energy-responsive means and mounted for rotation about said energy-responsive means and about an axis fixed with respect to said support means, a recording element carried by said optics and responsive to the output of said energy-responsive means, arched paper or the like supporting means carried by said support means and including means for arching recording paper or the like in an arc about the scan axis and substantially in the radial plane of movement of said recording element, and paper-holding means fixed to said frame, whereby recording paper or the like held by said frame and arched by said paper-support means may in effect move relatively to the radial plane of movement of said recording element during a scan-depression movement of said support means about said scan-depression axis.

15. Optical-scanning and recording means, comprising a frame, support means inclinable about a scan-depression axis fixed with respect to said frame, energy-responsive means relatively fixedly carried by said support means, optics including a plurality of angularly spaced focusing elements focused on said energy-responsive means and mounted for rotation about said energy-responsive means on a scan axis fixed with respect to said support means, a plurality of recording elements spaced in accordance with the angular spacing of said recording elements and carried thereby and responsive to the output of said energy-responsive means, frame-fixed support means for recording paper or the like and including means for arching a piece of recording paper or the like over a sector arcuate about the scan axis and arcuate about the scan-depression axis.

16. Optical-scanning and recording means according to claim 15, in which said last defined means includes edge guides for a continuous strip of recording paper or the like, and indexing means for advancing recording paper or the like through said edge guides, whereby several successive exposures may be made on successively indexed portions of a single piece of recording paper or the like.

17. Optical-scanning and recording means, comprising support means, a scanning optical element rotatably mounted on said support means on a scan axis, energy-responsive means carried by said support means and disposed for response to radiation collected by said optical element, a radiation source carried for rotation with said element, means for modulating said source in response to the output of said energy-responsive means, and a non-rotated recording paper or the like arched about said scan axis and responsive to emanations from said source, said recording paper or the like being non-responsive to the energy to which said energy-responsive means is responsive.

18. Optical-scanning and recording means according to claim 17, and including filtering means screening said optical element and, therefore, also said energy-responsive means from all but substantially the desired response band, said paper or the like being substantially non-responsive to energy passed by said filtering means.

19. Optical-scanning and recording means according to claim 18, in which said filtering means passes substantially only infrared energy, and in which said recording paper or the like is responsive substantially only to visible light.

20. Optical scanning and recording means, comprising a frame, support means inclinable about a scan-depression axis on said frame, scanning optics including a mirror element movably carried by said support means, relatively fixed energy-responsive means at the focus of said optics, whereby said optics may image said energy-responsive means via said mirror element in a field to be scanned, means for driving said mirror element for movement to cause said image to scan the field about an axis generally transverse to said scan-depression axis, recording means responsive to the output of said energy-responsive means and including a source element and an optical element, one of said latter elements being fixed with respect to said mirror element and therefore movable therewith, and a photosensitive surface fixed with reference to said frame and positioned for exposure to light projected by said recording means as said mirror element scans said field.

References Cited in the file of this patent

UNITED STATES PATENTS

| | | |
|---|---|---|
| 1,985,715 | Bucky | Dec. 25, 1934 |
| 2,419,024 | Iams | Apr. 15, 1947 |
| 2,465,957 | Dienstbach | Mar. 29, 1949 |
| 2,553,606 | Rines | May 22, 1951 |
| 2,570,251 | Lester | Oct. 9, 1951 |
| 2,575,742 | Baltin et al. | Nov. 20, 1951 |
| 2,578,307 | Hunt | Dec. 11, 1951 |
| 2,709,716 | Haller | May 31, 1955 |

UNITED STATES PATENT OFFICE
Certificate of Correction

Patent No. 2,832,820                                   April 29, 1958

Henry Blackstone

It is hereby certified that error appears in the printed specification of the above numbered patent requiring correction and that the said Letters Patent should read as corrected below.

In the drawing, the present sheet should appear as shown below instead of as in the patent—

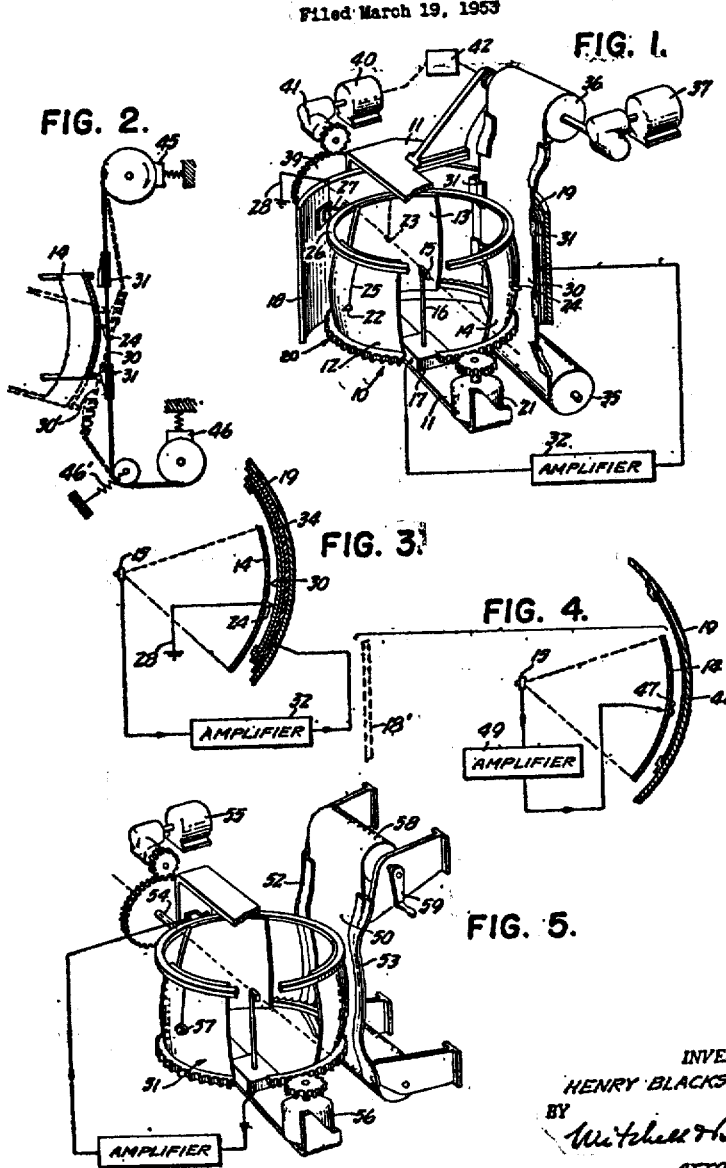

Signed and sealed this 5th day of August 1958.

[SEAL]

Attest:
KARL H. AXLINE,
*Attesting Officer.*

ROBERT C. WATSON,
*Commissioner of Patents.*